Nov. 8, 1932.  R. B. JOHNSON  1,887,411
AIRCRAFT CONSTRUCTION
Filed Aug. 12, 1931

Richard B. Johnson,
INVENTOR
BY Victor J. Evans & Co
HIS ATTORNEYS.

Patented Nov. 8, 1932

1,887,411

UNITED STATES PATENT OFFICE

RICHARD B. JOHNSON, OF CHICAGO, ILLINOIS

AIRCRAFT CONSTRUCTION

Application filed August 12, 1931. Serial No. 556,654.

This invention relates to certain novel improvements in aircraft construction, and has for its principal object the provision of an improved construction of this character which will be highly efficient in use and economical in manufacture.

Among the objects of this invention are to provide a heavier-than-air craft that is compact; has a relatively large payload space; is structurally strong and safe; that is adaptable to water landings and is possessed of "pancaking" ability; and in which high lifting efficiency is sacrificed for light weight and in which high airfoil drag is substituted for parasite resistance.

Another object of the invention is to provide an aircraft construction in which the fuselage and wing structures are one and the same unit and coextensive with each other.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
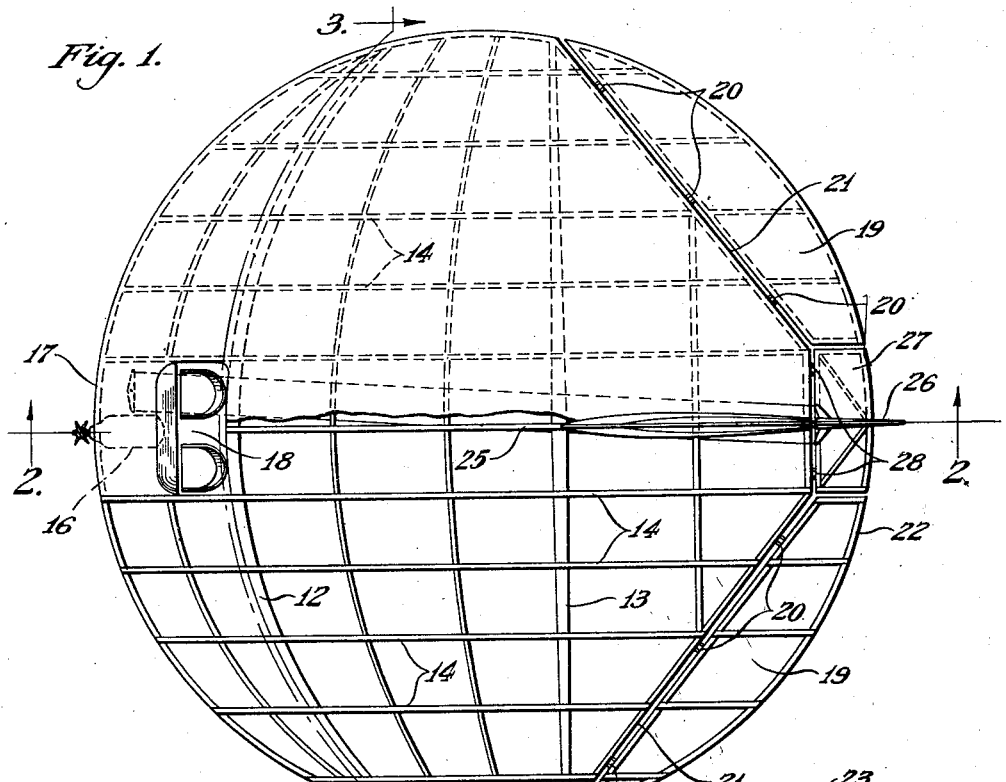
Fig. 1 is a top plan view of an aircraft constructed in accordance with my invention.
Figure 2:
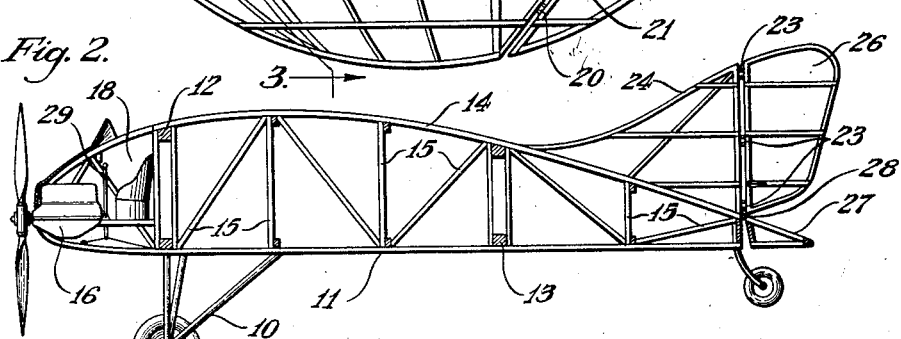
Fig. 2 is a sectional view on line 2—2 in Fig. 1, and showing the structure as an airfoil.
Figure 3:
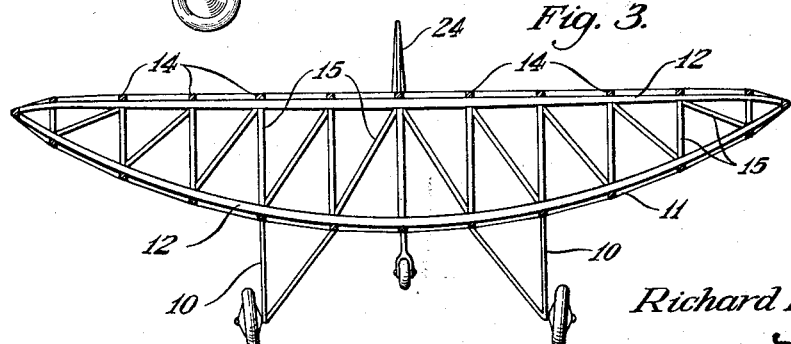
Fig. 3 is a sectional view on line 3—3 in Fig. 1.

In the drawing, which illustrates a preferred and practical embodiment of the invention, a conventional landing gear is indicated at 10 and is suspended from my novel design of fuselage 11 which, in the present instance is circular in plan and convex on the bottom to obtain the necessary dihedral.

Extending across the fuselage are two main spars 12 and 13, the ribs 14 being braced by a conventional arrangement of struts 15.

One or more power units 16 are placed in the airfoil nose and are completely cowled by the leading edge 17, the pilots cabin 18 being placed in the center of the nose with space for passengers and freight arranged along the spar 12. If air cooled engines 16 are employed suitable openings may be provided in the leading edge 17 to provide an air flow for the engines and louvres for the escape of the air may be provided in the bottom of the airfoil back of the engine.

The elevator-ailerons 19 are hinged, as at 20, to supports 21 that extend, as chords of a circle (Fig. 1), at about 45° from the spar 13 toward the rear edge 22 and these members 19 are so connected to the control stick 29 that in addition to acting as elevators they also act as ailerons, though this arrangement does not make the control system differ from the conventional. The vertical tail surface 24 extends from the rear edge 22 along the fore and aft diameter 25 about thirty percent of the length of this diameter and is gradually flared into the airfoil. Pivotally attached to the vertical tail surface 24, in a conventional manner, as at 23, and likewise controlled by conventional elements from the pilot's cabin, is the vertical rudder 26, below which and between the ailerons 19, is the horizontal stabilizer 27 that is adjustable in a vertical plane, as at 28, for reasons well known in the art.

By reason of the short span or low aspect ratio of the ship embodying my new design the lift thereof is between about 50% and 60% of that of a conventional type of plane of equal wing area and airfoil section but because of the short span of my design and the comparative thickness of the combined fuselage and wing structure, the structural stresses are very low and allow for light weight construction which compensates for lost lifting efficiency. Moreover, because of the short span the wing drag is comparatively great but this is compensated for and offset by the low parasite resistance since my novel design lacks the non-lifting units and wing supports outside the airfoil on conventional ships, and since parasite resistance increases rapidly with speed while wing drag decreases up to a certain point I obtain an advantage by my new design.

The use of an airfoil, such as I have shown, with both center of pressure travel results in the ship being inherently stable because of natural sweeploads due to span taper which gives longitudinal and directional stability, while the dihedral on the bottom gives lateral stability.

While I have shown my improved wing structure as circular in plan view I do not limit my improved design to this form but may apply it to any form, such, for example, as oval, whose span-chord or aspect ratio is small enough to allow the construction to be one unit with the control surfaces within the boundaries of the wing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A heavier-than-air craft including a wing structure whose aspect ratio is about one to one, and control elements for the craft, the surfaces of said control elements being arranged substantially within the boundaries of the wing structure, said structure being substantially circular in plan view, and convex on the bottom side thereof to provide dihedral, said control elements including elevator-ailerons hingedly connected to the body of said craft and extending as chords of a circle on opposite sides of the fore and aft diameter of said body.

In testimony whereof I affix my signature.

RICHARD B. JOHNSON.